United States Patent
Doelz et al.

(10) Patent No.: US 10,958,126 B2
(45) Date of Patent: Mar. 23, 2021

(54) MACHINE UNIT, COMPONENT PIECE AND INTERMEDIATE ELEMENT, AND METHOD FOR CONNECTING AND/OR DISCONNECTING A CONNECTION LINE

(71) Applicant: Siemens Aktiengesellschaft, Munich (DE)

(72) Inventors: Volker Doelz, Bad Neustadt (DE); Melanie Schoeppach, Mellrichstadt-Bahra (DE)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 15/772,734

(22) PCT Filed: Oct. 7, 2016

(86) PCT No.: PCT/EP2016/074035
§ 371 (c)(1),
(2) Date: May 1, 2018

(87) PCT Pub. No.: WO2017/076578
PCT Pub. Date: May 11, 2017

(65) Prior Publication Data
US 2019/0214880 A1    Jul. 11, 2019

(30) Foreign Application Priority Data
Nov. 2, 2015 (EP) .................................. 15192507

(51) Int. Cl.
*H02K 5/22* (2006.01)
*H02K 9/04* (2006.01)
(Continued)

(52) U.S. Cl.
CPC .............. *H02K 5/225* (2013.01); *H02K 5/04* (2013.01); *H02K 5/10* (2013.01); *H02K 9/04* (2013.01);
(Continued)

(58) Field of Classification Search
CPC .. H02K 5/04; H02K 5/10; H02K 5/22; H02K 5/225; H02K 9/04; H02K 9/06; H02K 11/33; H02K 15/0062
(Continued)

(56) References Cited

U.S. PATENT DOCUMENTS 3,858,755 A * 1/1975 Tellen ................. E02D 29/1427
                                                        220/284
D752,184 S * 3/2016 Eaton ............................ D23/249
(Continued)

FOREIGN PATENT DOCUMENTS

CN    102195383         9/2011
DE       4304032 A1 *  8/1994 ............. H02K 5/225
(Continued)

OTHER PUBLICATIONS

Fernsebner et al., English Machine Translation of DE-4304032-A1 (Year: 1994).*
(Continued)

*Primary Examiner* — Tulsidas C Patel
*Assistant Examiner* — Rashad H Johnson
(74) *Attorney, Agent, or Firm* — Cozen O'Connor

(57) ABSTRACT

A machine unit, component piece and intermediate element, and method for connecting and/or disconnecting a connection line to/from a machine unit, wherein a region includes an intermediate element and a component piece is substantially enclosed between an electrical machine and a functional element of the machine element, where the component piece can be removed or folded away from the
(Continued)

intermediate element, where after the component piece is removed from the intermediate element, the sheathed region is advantageously accessible for connection by way of a connection line, and where a transmitter, for example, is connectable via the connection line to permit connection of the connection line in the sheathed region without the functional element having to be removed such that an electrical machine that includes the functional element can also be serviced in locations that are difficult to access.

11 Claims, 4 Drawing Sheets

(51) Int. Cl.
  *H02K 5/04* (2006.01)
  *H02K 11/33* (2016.01)
  *H02K 5/10* (2006.01)
  *H02K 9/06* (2006.01)
  *H02K 15/00* (2006.01)

(52) U.S. Cl.
  CPC .............. *H02K 9/06* (2013.01); *H02K 11/33* (2016.01); *H02K 15/0062* (2013.01)

(58) Field of Classification Search
  USPC ................. 310/52, 54, 62, 63, 64, 71, 89
  See application file for complete search history.

(56) References Cited

U.S. PATENT DOCUMENTS

| | | |
|---|---|---|
| 2011/0226072 A1 | 9/2011 | Safari Zadeh et al. |
| 2013/0001051 A1* | 1/2013 | Oppliger ................ B65G 17/32 198/836.1 |
| 2015/0236570 A1* | 8/2015 | Hayashi ................ H02K 11/33 310/45 |
| 2015/0333586 A1* | 11/2015 | Hirotani ................ H02K 1/278 310/68 D |
| 2015/0333600 A1* | 11/2015 | Nakano ................ H02K 11/33 310/71 |

FOREIGN PATENT DOCUMENTS

| | | | |
|---|---|---|---|
| DE | 4304032 A1 | 8/1994 | |
| DE | 102006054807 A1 * | 6/2008 | .............. H02K 11/20 |
| DE | 102006054807 A1 | 6/2008 | |
| EP | 1337029 A1 | 8/2003 | |
| EP | 2800251 A1 * | 11/2014 | ............... H02K 9/14 |
| EP | 2800251 A1 | 11/2014 | |
| GB | 668482 A | 3/1952 | |

OTHER PUBLICATIONS

Grillenberger et al. English Machine Translation of EP-2800251-A1 (Year: 2014).*

Dolz et al., English Machine Translation of DE 102006054807 (Year: 2008).*

PCT International Examination Report and Written Opinion of International Examination Authority dated Jan. 17, 2017 corresponding to PCT International Application No. PCT/EP2016/074035 filed Oct. 7, 2016.

Office Action dated Jul. 20, 2020 issued Chinese Patent Application No. 2016800621771.

* cited by examiner

MACHINE UNIT, COMPONENT PIECE AND INTERMEDIATE ELEMENT, AND METHOD FOR CONNECTING AND/OR DISCONNECTING A CONNECTION LINE

CROSS-REFERENCE TO RELATED APPLICATIONS

This is a U.S. national stage of application No. PCT/EP2016/074035 filed Oct. 7, 2016. Priority is claimed on EP Application No. 15192507 filed Nov. 2, 2015, the content of which is incorporated herein by reference in its entirety.

BACKGROUND OF THE INVENTION

1. Field of the Invention

The invention relates to a machine unit, a component piece and an intermediate element, and to a method for connecting and/or disconnecting a connection line.

2. Description of the Related Art

Externally ventilated electrical machines mostly have a fan on at least one side of their housing, which cools the electrical machine with the aid of a flow or air. The combination of an electrical machine and a functional element, which is attached to an electrical machine, is referred to as a machine unit. A functional element can be a fan, for example. Particularly with servo motors, the machine unit has a transmitter between the fan and the electrical machine, where the transmitter has a connection for a connection line. To connect the connection line to the transmitter, in accordance with the current prior art, first of all the fan or another functional element must be removed. The removal of the fan is time-consuming and, with electrical machines that are difficult to access, is a difficult and time-consuming task. With other electrical machines the connection line runs so that, to switch the connection line of the electrical machine, a fan or another part, such as a control device, must likewise be removed.

DE 43 04 032 discloses an angle measuring device with a housing, where the housing has a cutout, and where the cutout is able to be covered by a hinged cover.

SUMMARY OF THE INVENTION

In view of the foregoing, it is therefore an object of the invention to simplify the way in which an area between an electrical machine and a fan or another functional element is accessed.

This and other objects and advantages are achieved in accordance with the invention by a machine unit, a method for connecting and/or disconnecting a connection line to a machine unit, an intermediate element and a component piece for spacing an electrical machine away from a functional element, and by a drive with such a machine unit.

Here, a machine unit is to be understood as a unit consisting of an electrical machine, a functional element and if necessary further elements such as a transmitter or a torque converter.

An electrical machine is to be understood as an electric motor or a generator. The invention is also suitable for use with a transformer as electrical machine.

A functional element can be understood to be a converter element, a transmission or a control device. Preferably, the functional element is a fan, which is attached to the rear side of the electrical machine. The fan serves to cool the electrical machine, as well as optionally to keep the electrical machine clean. The functional element is connected to the electrical machine via a functional element attachment device.

The connection line can be connected to a transmitter, to the electrical machine, to the functional element and/or can be disconnected from the functional element. A plug and socket connection or a screw connection is suitable for connection of the connection line.

The intermediate element is preferably a U-shaped profile piece, which is adapted to the shape and size of the electrical machine. The component piece can be formed as a straight sheet of metal or as a U-shaped profile piece. The sides of the intermediate element and the component piece are matched to one another. The intermediate element and the component piece, which is attached to the intermediate element, form a sheath around the area that extends between the functional element and the electrical machine. The thickness of the sheath or a wall thickness of the intermediate element and of the component piece is to be chosen to be at least large enough for the component piece to be able to be attached to the intermediate element.

The component piece is configured in particular as a cover for covering the intermediate element, where the intermediate element is attached between the electrical machine and the functional element. The intermediate element and the component piece enclose the area between the electrical machine and the functional element.

The component piece is attached to the intermediate element on at least one side. At least one attachment device, such as a screw, is used for attaching the component piece to the intermediate element. As well as a screw, a clamp connection is suitable for attaching the component piece to the intermediate element. It should be understood the component piece can also be attached to the functional element and/or to the electrical machine.

Accessibility is to be understood as the connection line largely being able to be attached manually to the transmitter, to the electrical machine and/or to the functional element. The manual connection can also be made with the aid of a tool. In particular, a transmitter that is attached to the rear side of the electrical machine can be connected by a connection line to a control device. Advantageously, the component piece is able to be altered in its alignment enough for the largely enclosed area to be easily accessible and for the connection line to be connected and/or disconnected without any problems.

To connect and/or disconnect the connection line, the alignment of the component piece is altered, in particular the component piece is folded upwards, or it is removed entirely from the intermediate element. Subsequently, the connection line is connected and/or a connection line is disconnected. Lastly the component piece is guided back into its initial position, i.e., folded back, and attached.

After the connection line is connected or switched, the component piece is again firmly connected to the intermediate element.

The connection line passes through a cutout in the component piece and/or in the intermediate element in the sheathed area.

The position of the cutout is advantageously to be chosen such that the connection line does not remain connected to the component piece or to the intermediate element when the alignment is altered or when it is removed and can be introduced or removed without any difficulties.

The invention makes it possible for the connection line to be connected or disconnected from a connection quickly and easily. The connection is advantageously located between the rear side of the electrical machine and the functional element. After the component part has been removed or hinged open from the intermediate element, easy access into the area between the electrical machine and the functional element is advantageously possible. This advantageously enables maintenance work to be simplified and also the electrical machine to be protected from damaging influences.

An advantageous machine unit is characterized by the fact that the functional element is a fan. The fan serves, for example, to ventilate a stator or a rotor of the electrical machine. In particular, the fan serves to ventilate and thus to cool windings of the electrical machine. The fan can also serve to cool the functional unit, in particular a converter.

The intermediate element and the component piece form a guide for the flow of cooling air of the fan. The flow of cooling air advantageously runs past the transmitter in cooling channels of the electrical machine.

A largely enclosed area between the fan and the electrical machine serves to channel the air introduced into the electrical machine by the fan. The largely enclosed area is delimited on one side by the electrical machine, on the other side by the functional element. On each side, the largely enclosed area is sheathed by the intermediate element and the component piece. In this case, it is essentially only the cutout for the passage of the connection line that remains free.

The intermediate element and the component piece thus serve as a channel for the air while the electrical machine is operating. At the same time, access to the largely sheathed area between the fan and the electrical machine advantageously remains accessible.

In a further advantageous embodiment of the machine unit, the component piece is attached detachably to the intermediate element by at least one attachment device. The component piece is connected detachably to the intermediate element by an attachment device, i.e., by a screw. In one embodiment, the component piece can be connected to the intermediate element at two positions, where the positions are located at two different support points of the intermediate element.

A clamping mechanism is suitable for an especially easily releasable attachment, with which the component part can be rapidly separated from the intermediate element or altered in its alignment, i.e., hinged open, without the use of a tool.

In a further advantageous embodiment of the machine unit, the cutout is located at a transition between intermediate element and component piece.

The cutout serves to enable the connection line to pass through it. The cutout can be kept round or rectangular. Advantageously, the cutout for the passage of the connection line is located in this case such that, after the component piece has been hinged open or removed from the intermediate element, the cutout and thereby optionally the connection line is freely accessible. In this way, the connection line can be connected through the cutout to the functional element, to the transmitter or to the electrical machine. With this configuration, the connection line is advantageously protected from a heavy load.

In a further advantageous embodiment of the machine unit, the intermediate element and optionally the component part is connected to the electrical machine by at least one functional element attachment device, where the functional element attachment device is intended for attaching the functional element to the electrical machine. The functional element is mostly attached to the electrical machine by a detachable connection. Screws are well suited as functional element attachment devices, which connect the functional element to the electrical machine spaced apart from it. Here, the functional element attachment device bridges the area that is covered by the intermediate element and the component part.

The functional element attachment device can serve to connect the functional element to the electrical machine through openings that are inserted into the intermediate element and the component part. The intermediate element and optionally the component part can also be attached to the electrical machine with a number of attachment devices and the functional element can be attached to the intermediate element and/or to the component part, especially with functional element attachment devices. The presently contemplated embodiment enables a simplified installation of the functional element on the electrical machine to be achieved, as well as advantageously enables savings to be made in the attachment device.

In a further advantageous embodiment of the machine unit, the component part and the intermediate element are intended to largely enclose a transmitter. A transmitter of an electrical machine predominantly serves to detect the position and/or the rotational speed of a rotor in the electrical machine. A transmitter often sits in an electrical machine at the rear end and thus in the largely enclosed area. For beneficial design reasons, the functional elements such as a control device, a converter and/or a fan, are also positioned at the rear end of the electrical machine.

Regularly an integration of the transmitter into the functional element is not possible. Therefore, the functional element is installed spaced away from the electrical machine. The area between the functional element and the electrical machine, without the intermediate element and the component piece, would not be largely enclosed and would therefore be open. As a result, the transmitter and the possibly accessible rear side of the electrical machine would be unprotected.

In a further advantageous embodiment of the electrical machine, the component piece is pivotably attached between the functional element and the electrical machine. In this embodiment, the component part is supported movably on one side and is able to be attached detachably on the opposite side to the intermediate element. This enables the component piece to be hinged open, meaning that it is able to be altered or pivoted in its alignment. The component piece can be configured to be hinged through an opening around a functional element attachment device. To this end, the functional element attachment device extends through an opening of the component piece. Here, the opening is located in the area of an edge of the component piece.

In an especially preferred embodiment, the functional element attachment device serves to attach the functional element to the electrical machine at a distance as an axis for the component piece. The component piece is able to be changed in its alignment, i.e., hinged open, in relation to this axis. The component piece is attached on the other side with the aid of an attachment device, i.e., a clamp connection. This thus enables the connection line to be switched, especially at the transmitter, by releasing just one attachment device.

In a further advantageous embodiment of the machine unit, the component piece is attached on one side to the intermediate element by a hinge. The hinge serves to change the alignment of the component piece in relation to the intermediate element. The hinge can be attached to the functional element, the intermediate element or the electrical machine.

On at least one side of the component piece, which in the closed state adjoins the surface of the intermediate element, the component piece can be attached to the intermediate element via the hinge.

The use of a hinge makes an especially high-quality and durable connection of the component piece to the intermediate element possible.

In a further advantageous embodiment of the machine unit, a seal is provided, so that the largely enclosed area, which is delimited by the component piece and the intermediate element, is protected from foreign substances, especially from dust or splashes of water. A delimitation of the area between the functional element and the electrical machine serves to protect the functional element and/or the electrical machine, as well as an optional transmitter, from external influences. Therefore, sealing of the areas at which the intermediate element and the component piece adjoin each other advantageously serves to protect the electrical machine and/or the functional element.

A seal can be formed by application of a polymer layer to the sections. The seal is especially advantageous at the areas at which the intermediate element and the component piece adjoin each other. A rubber seal in the areas of the sections is also suitable.

Such a seal advantageously enables the field of application of such an electrical machine to be expanded considerably. A seal can also comprise the connection line and serves to protect the connection line, especially from stresses as a result of mechanical loads.

The disclosed embodiments of the invention have wide applications, i.e., for machine units in a drive for electrically driven vehicles. Furthermore, maintenance-intensive industrial plants are advantageous fields of application for the disclosed embodiments of the invention as a result of the easy access to the connection line.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained in greater detail below with reference to figures. In said figures the same reference characters designate the same elements in all figures. Naturally the features shown in the figures can be combined into new forms of embodiment of the invention without departing from the invention described here, in which.

DETAILED DESCRIPTION OF THE EXEMPLARY EMBODIMENTS

Figure 1:
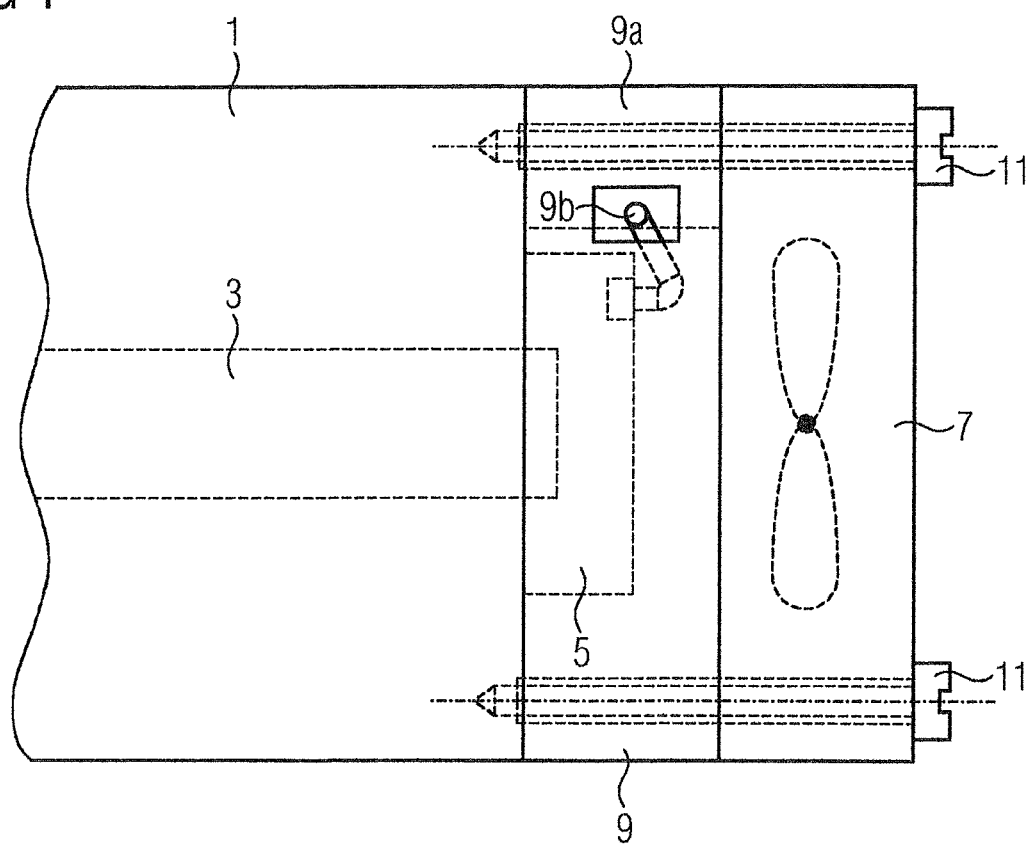
FIG. 1 shows an electrical machine with a functional element in accordance with the invention.

FIG. 1 shows an electrical machine 1 with a functional element 7. The functional element 7 is shown here as a fan. The electrical machine 1 has a transmitter 5 on its rear side. The transmitter 5 is coupled to the rotor 3 of the electrical machine 1. The transmitter 5 is located between the electrical machine 1 and the functional element 7. The functional element is attached to the electrical machine 1 by functional element attachment device 11. The area between the electrical machine 1 and the functional element 7, except for a cutout 9c, is enclosed by an intermediate element 9 and a component piece 9a.

The component piece 9a and the intermediate element 9 have a cutout 9c on one side. The cutout 9c serves to enable a connection line 9b to pass through into the sheathed area. The cutout 9b is largely located in the component piece 9a. The cutout 9c can, however, also be located on the intermediate element 9 or in the component piece 9a. The connection line 9b, upon separation of the component piece 9a from the intermediate element 9, can be connected manually to the transmitter 5. Here, manually means that, for connection and/or disconnection of the connection line 9b, because of the size of the largely enclosed area, a complicated tool for changing/connecting the connection line 9b is not necessary. After the manual connection of the connection line 9b to the transmitter 5, the component piece 9a can be again guided to the intermediate element 9. The component piece is either only attached to the intermediate element 9 or is attached on a maximum of one side to the intermediate element 9, provided the alignment of the component piece 9a can altered.

Figure 2:
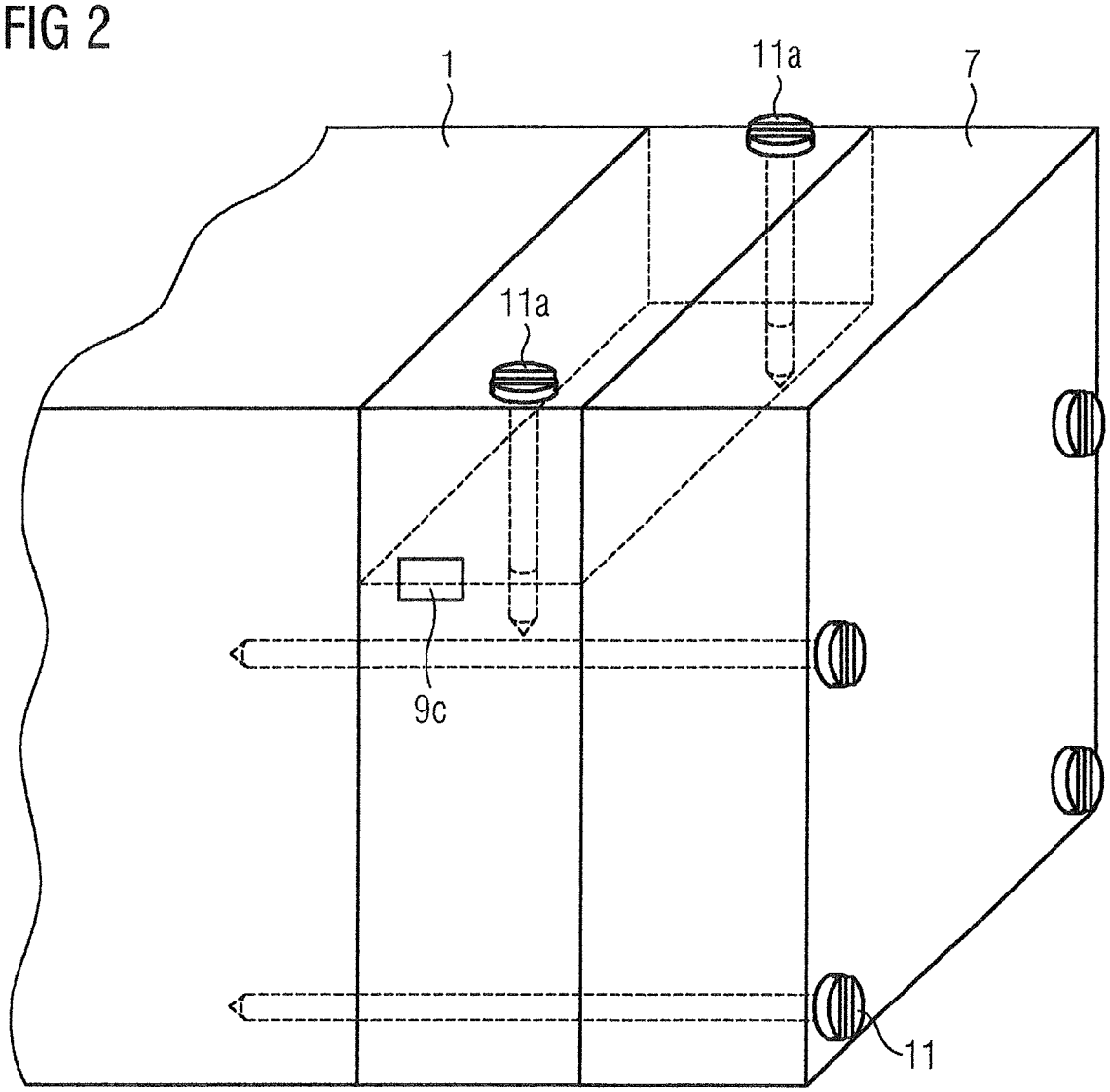
FIG. 2 shows the machine unit viewpoint in accordance with the invention from another viewpoint.

FIG. 2 shows the machine unit from another viewpoint. In the version shown here, the component piece 9a is attached to the upper side of the intermediate element 9. The component piece 9a is attached by two attachment devices 11a. Screws are shown here as the attachment devices 11a. The functional element attachment devices 11 each pass through the component piece 9a through an opening in the piece. Further functional element attachment devices 11 engage in the intermediate element 9 and serve to attach the functional element 7. Instead of the screws shown, the functional element attachment devices 11 can also be formed by a clamping facility.

Functional element attachment devices 11 serve to attach the functional element 7 to the electrical machine 1. Screws are to be preferred here as functional element attachment devices 11. The functional element 7 is attached to the electrical machine 1 spaced away from it by the width of the intermediate element 9 and/or by the width of the component piece 9a. The functional element attachment devices 11 pass through the largely enclosed area and engage in the electrical machine 1.

The cutout 9c is located at the boundary between the intermediate element 9 and the component piece 9a. The connection line 9b can be guided through the cutout 9c into the interior of the largely enclosed area.

In the presently illustrated embodiment of the invention, the functional element attachment device 11 and the attachment device 11a are accessible from the outside. It is, however, also possible for the functional element 7 to be attached to the intermediate element 9 and for the intermediate element 9 to be attached to the electrical machine 1. This also applies correspondingly for the component piece 9a.

In the presently illustrated exemplary embodiment, it is also possible for the functional element attachment device 11 to extend entirely in the area of the intermediate element 9, i.e., to be arranged further down, contrary to the position shown. In this way, the functional element attachment devices 11 do not impede access to the connection line 9b and/or to the transmitter 5. The functional element attachment device 11 can be arranged entirely in the area of the intermediate element 9 and optionally pass through openings in the intermediate element 9.

Figure 3:
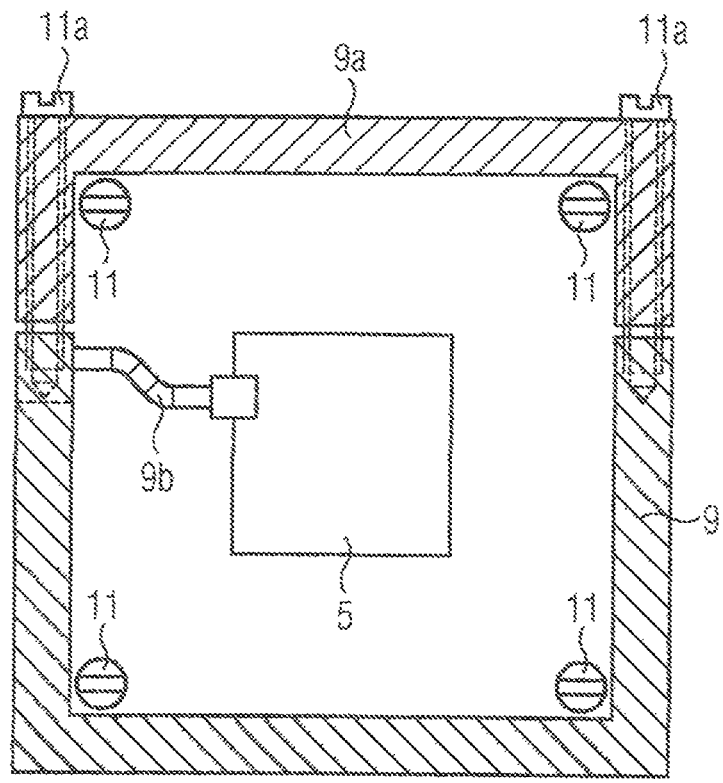
FIG. 3 shows a profile diagram of the intermediate element and of the component piece in accordance with the invention.

FIG. 3 shows a profile diagram of the intermediate element 9 and the component piece 9a. The profile diagram shows the rear side of the electrical machine 1. The largely enclosed area has the transmitter 5 in the middle, where the transmitter 5 is assigned to the electrical machine 1. The largely enclosed area is delimited on the underside and in some areas at the side surfaces by the intermediate element 9. The component piece 9a is placed on the intermediate element 9.

The component piece 9a is detachably attached with the aid of two attachment devices 11a. The intermediate element 9 has the cutout 9c. The cutout 9c serves to allow the passage of the connection line 9b from the largely enclosed area. Here, the connection line 9b serves to connect the transmitter 5 of the electrical machine 1. The connection line 9b is routed through the cutout 9c, in this case.

The functional element attachment means 11, which are provided for attaching the functional element 7, extend in the corners of the sheathed area.

Figure 4:
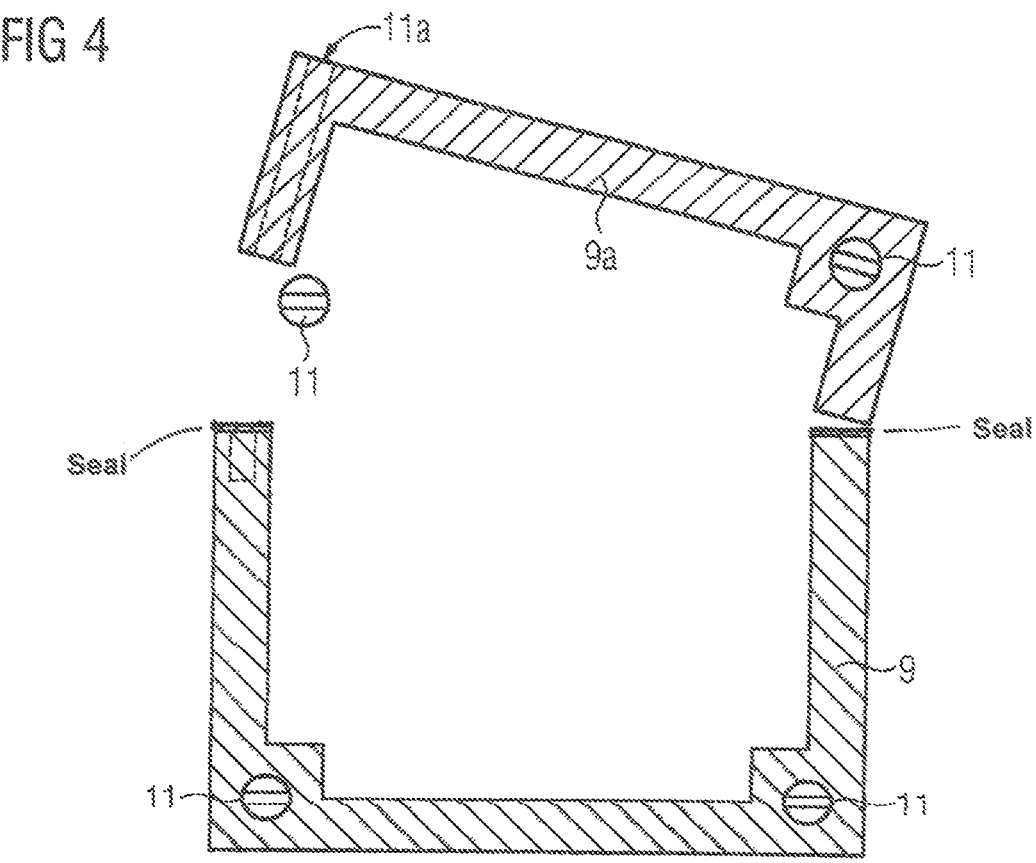
FIG. 4 shows an intermediate element and a component piece in accordance with the invention.

FIG. 4 shows an intermediate element 9 and a component piece 9a. The alignment of the component piece 9a can be altered. The alignment of the component piece 9 can be altered by the functional element attachment device 11 as an axis. Thus, one functional element attachment device 11 serves as an axis of rotation for the component piece 9a. The intermediate element 9 has openings for the passage of the functional element attachment device 11. The component piece 9a is attached on one side to the intermediate element 9 with an attachment device 11a. Advantageously, the piece is attached by a single attachment device 11a. On the side upon which the component piece 9a will be attached to the intermediate element 9, the functional element attachment device 11 is merely indicated. Advantageously, the alignment of the component piece 9a is not influenced by the functional element attachment device 11.

In summary, the invention relates to a machine unit, a component piece 9a and an intermediate element 9 and also to a method for connection and/or disconnection of a connection line 9b to a machine unit. Between an electrical machine 1 and a functional element 7 of the machine unit, an area with an intermediate element 9 and a component piece 9a is largely enclosed. The component piece 9a can be removed or hinged open from the intermediate element 9. The component piece 9a is removed by the release of two attachment elements 11a. The component piece is advantageously opened up by releasing a single attachment device 11a. After removal of the component piece 9a from the intermediate element 9, the (largely) sheathed area is advantageously accessible for connection of a connection line 9b. A transmitter 5 can be connected to the connection line 9b, for example. The invention enables the connection line 9b to be connected in the sheathed area, without having to remove the functional element 7. This enables an electrical machine 1 with a functional element 7 to be maintained even in poorly accessible places.

Figure 5:
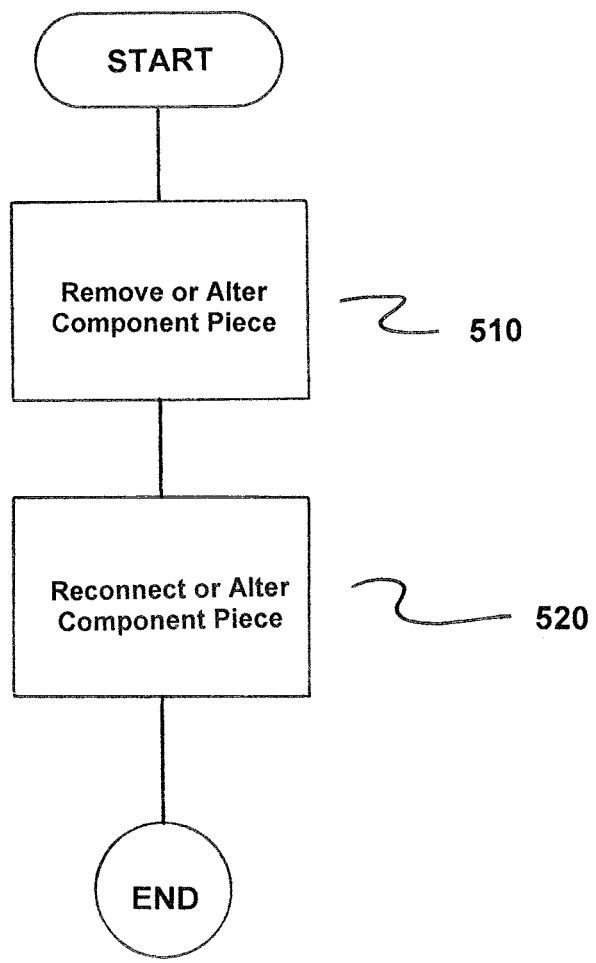
FIG. 5 is a flowchart of the method in accordance with the invention.

FIG. 5 is a flowchart of a method for connecting and/or disconnecting a connection line 9b to a machine unit, where an area between the electrical machine 1 and the functional element 7 with the component piece 9a and the intermediate element 9 is substantially enclosed. The method comprises either (i) removing the component piece 9a between the functional element 7 and the electrical machine 1 and/or (ii) altering an alignment of the component piece 9a such that the area becomes accessible for switching the connection line 9b to connect at least one of (i) the electrical machine 1, (ii) a transmitter 5 and (iii) the functional element 7, as indicated in step 510.

Next, either (i) the component piece (9a) is reconnected to the intermediate element 9 (ii) and the alignment of the component piece 9a is altered such that, after the connection line 9b has been switched, the area is again substantially enclosed by the component piece 9a and the intermediate element 9, as indicated in step 520.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those structures and/or elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A machine unit, comprising:
   an electrical machine;
   a u-shaped intermediate element; and
   a u-shaped component piece;
   a functional element connected to the electrical machine and spaced away from said electrical machine, via the u-shaped intermediate element and the u-shaped component piece;
   wherein the u-shaped intermediate element and the u-shaped component piece, except for a cutout, largely enclose the area between the electrical machine, and the functional element,
   wherein at least one of (i) the u-shaped component piece is removable and (ii) an alignment of the u-shaped component piece in relation to the intermediate element is alterable;
   wherein by one of (i) removal and (ii) alignment of the u-shaped component piece, an area between the electrical machine and the functional element becomes accessible for at least one of (i) connection and (ii) disconnection of a connection line;
   wherein the u-shaped component piece is detachably attached to the u-shaped intermediate element with at least one attachment device; and wherein the cutout is located in a transition area between the u-shaped intermediate element and the u-shaped component piece.

2. The machine unit as claimed in claim 1, wherein the u-shaped intermediate element and optionally the u-shaped component piece are connected by at least one functional element attachment element to the electrical machine; and wherein the functional element attachment device attaches the functional element to the electrical machine.

3. The machine unit as claimed in claim 1, wherein the u-shaped component piece and the u-shaped intermediate element are configured to substantially enclose a transmitter.

4. The machine unit as claimed in claim 1, wherein the u-shaped component piece is pivotably attached between the functional element and the electrical machine.

5. The machine unit as claimed in claim 1, wherein the u-shaped component piece is attached on one side to the u-shaped intermediate element via a hinge.

6. The machine unit as claimed in claim 1, further comprising:

a seal, such that a substantially enclosed area delimited by the u-shaped component piece and the u-shaped intermediate element is protected from foreign substances.

7. The machine unit as claimed in claim 6, wherein the foreign substances comprise one of dust and splashes of water.

8. The machine unit as claimed in claim 6, wherein the functional element is a fan.

9. A drive having the machine unit as claimed in claim 1.

10. A method for connecting and/or disconnecting a connection line to a machine unit, an area between the electrical machine and a functional element with a u-shaped component piece and a u-shaped intermediate element being substantially enclosed, the method comprising:

one of (i) removing the u-shaped component piece between the functional element and the electrical machine and (ii) altering an alignment of the u-shaped component piece such that an area becomes accessible for switching the connection line to connect at least one of (i) the electrical machine, (ii) a transmitter and (iii) the functional element; and one of (i) reconnecting the u-shaped component piece to the u-shaped intermediate element (ii) and altering alignment of the u-shaped component piece such that, after the connection line has been switched, the area is again substantially enclosed by the u-shaped component piece and the u-shaped intermediate element.

11. A u-shaped intermediate element and a u-shaped component piece for spacing an electrical machine away from a functional element, wherein the u-shaped component piece and the u-shaped intermediate element are arrangeable between at least one of (i) an electrical machine and (ii) the functional element, and wherein the u-shaped component piece is one of either able to be altered in its alignment and (ii) removable after release of at least one functional element attachment device.

* * * * *